(12) United States Patent
Dvonch et al.

(10) Patent No.: US 10,587,824 B2
(45) Date of Patent: Mar. 10, 2020

(54) IMAGING SYSTEMS WITH PULSE DETECTION FOR SEARCH AND RESCUE

(71) Applicant: Sensors Unlimited, Inc., Princeton, NJ (US)

(72) Inventors: Curt Dvonch, Salt Lake City, UT (US); Albert P. Allard, Titusville, NJ (US)

(73) Assignee: Sensors Unlimited, Inc., Princeton, NJ (US)

( * ) Notice: Subject to any disclaimer, the term of this patent is extended or adjusted under 35 U.S.C. 154(b) by 118 days.

(21) Appl. No.: 15/672,045

(22) Filed: Aug. 8, 2017

(65) Prior Publication Data

US 2019/0052818 A1    Feb. 14, 2019

(51) Int. Cl.

| | | |
|---|---|---|
| *G06T 11/60* | (2006.01) | |
| *H04N 5/272* | (2006.01) | |
| *H04N 7/18* | (2006.01) | |
| *G01J 3/457* | (2006.01) | |
| *H04N 5/225* | (2006.01) | |

(52) U.S. Cl.
CPC .............. *H04N 5/272* (2013.01); *G01J 3/457* (2013.01); *G06T 11/60* (2013.01); *H04N 5/2256* (2013.01); *H04N 7/183* (2013.01)

(58) Field of Classification Search
None
See application file for complete search history.

(56) References Cited

U.S. PATENT DOCUMENTS

| | | |
|---|---|---|
| 5,270,780 A | 12/1993 | Moran et al. |
| 9,568,583 B2 | 2/2017 | Caplan |
| 2011/0233409 A1* | 9/2011 | Weida ............... B82Y 20/00 250/338.4 |
| 2014/0267723 A1* | 9/2014 | Davidson, Jr. ...... H04N 7/183 348/147 |
| 2015/0092179 A1 | 4/2015 | van Cruyningen |
| 2016/0370226 A1 | 12/2016 | Lund |
| 2017/0064235 A1 | 3/2017 | Wang et al. |
| 2018/0005503 A1* | 1/2018 | Kaindl ................ G08G 1/166 |

* cited by examiner

*Primary Examiner* — Pankaj Kumar
*Assistant Examiner* — Charles N Hicks
(74) *Attorney, Agent, or Firm* — Locke Lord LLP; Scott D. Wofsy; Judy R. Naamat

(57) ABSTRACT

An imaging method includes imaging a scene having a pulsed light source and associating a symbol with the light source. The image is enhanced by inserting a symbol into the image indicative of location of the pulsed light source in the scene. The symbol overlays the image in spatial registration with the location of the pulsed light source in the scene to augment indication of the location provided by the pulsed light source. Imaging systems are also described.

17 Claims, 3 Drawing Sheets

IMAGING SYSTEMS WITH PULSE DETECTION FOR SEARCH AND RESCUE

BACKGROUND OF THE INVENTION

1. Field of the Invention

The present disclosure relates to imaging, and more particularly to imaging systems and methods employing pulse detection for image enhancement.

2. Description of Related Art

Search and rescue missions are commonly undertaken to locate individuals in need of assistances. In some searches, such as expansive environments or in rugged terrain, it can be necessary to employ aircraft to assist in locating individuals that have become lost or are incapacitated due to the size of the search area and/or the obstacles presented to ground-based searchers by the search area. Not all each and rescue missions are successful, and in some instances lost or incapacitated individuals suffer harm or succumb to the environment due to the time required for the searchers to locate the individual.

To facilitate search and rescue effort, emergency locator beacon (ELB) devices have been developed for vehicles like ships and aircraft. ELB devices are generally incorporated into vehicles or are carried by individuals, such by aircraft transiting difficult terrain or engaged in flight over water. Such ELB devices generally emit a signal when activated, either automatically or by actuation through user input, after which the ELB device emits a signal discernable by searches for a period of time after activation. The range at which the signal is discernable is a function of the signal modality, strength, and the conditions of the environment searched.

Such conventional methods and systems have generally been considered satisfactory for their intended purpose. However, there is still a need in the art for improved imaging methods and imaging systems, such as those employed in search and rescue missions. The present disclosure provides a solution for this need.

SUMMARY OF THE INVENTION

An imaging method includes imaging a scene having a pulsed light source and associating a symbol with the light source. The image is enhanced by inserting a symbol into the image indicative of location of the pulsed light source in the scene. The symbol overlays the image in spatial registration with the location of the pulsed light source in the scene to augment indication of the location provided by the pulsed light source.

In certain embodiments, imaging the scene can include receiving non-pulsed light and pulsed light. The pulsed light can be within a visible waveband. The non-pulsed light can be within a visible waveband. Image data can be generated from the non-pulsed light. Frequency data can be generated from the pulsed light. Frequency of the pulsed light source can be determined, for example, from the frequency data.

In accordance with certain embodiments, frequency of the pulsed light source can be compared to a set of frequency/symbol associations. A determination can be made as to whether the pulsed light source is associated with a locator device. A symbol can be selected based on the frequency of the pulsed light source and an association of the frequency with a symbol. It is contemplated that the image can be enhanced by inserting a map overlay into the image.

It is also contemplated that, in accordance with certain embodiments, the image can be enhanced by inserting one or more of gimbal directional data and aircraft positional information into the image. The image can be communicated to a user interface. The user interface can be co-located with the imaging system or remote from the imaging system. The image can be displayed on the user interface. The pulsed light source can faint such that the pulse light source is not readily discernable to a human observer monitoring the image. The pulsed light source can occupy five (5) or fewer pixels in the image.

In further embodiments, the pulsed light source can be a first pulsed light source and the symbol can be a first symbol. A determination can be made as to whether the second pulsed light source is associated with a second locator, and a second symbol associated with the second light source. The image can be enhanced by inserting a second symbol into the image indicative of location of the second pulsed light source in the scene. The second symbol can overlay the image in spatial registration with the location of the second pulsed light source in the scene. The image can be further enhanced by displaying a tally of symbols appearing in the image.

An imaging system includes an imaging and pulse detection array and a controller. The controller is disposed in communication with a memory and is operatively connected to the imaging and pulse detection array. The memory has a plurality of program modules recorded therein with instructions that, when read by the controller, cause the controller to image a scene having a pulsed light source, associate a symbol with the light source, and enhance the image by inserting a symbol into the image indicative of location of the pulsed light source in the scene. The symbol overlays the image and is in spatial registration with the location of the pulsed light source to augment indication of the pulsed light source in the scene.

In certain embodiments, the system includes a rising a pulsed light source configured to emit light having a selected frequency. The frequency can be associated with a symbol in a lookup table recorded on the memory. The pulsed light source can be remote. The pulsed light source can be powered by a self-contained power supply. The pulsed light can be incorporated into a wearable device, a hand-held device, a flotation device, or a survival suit.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
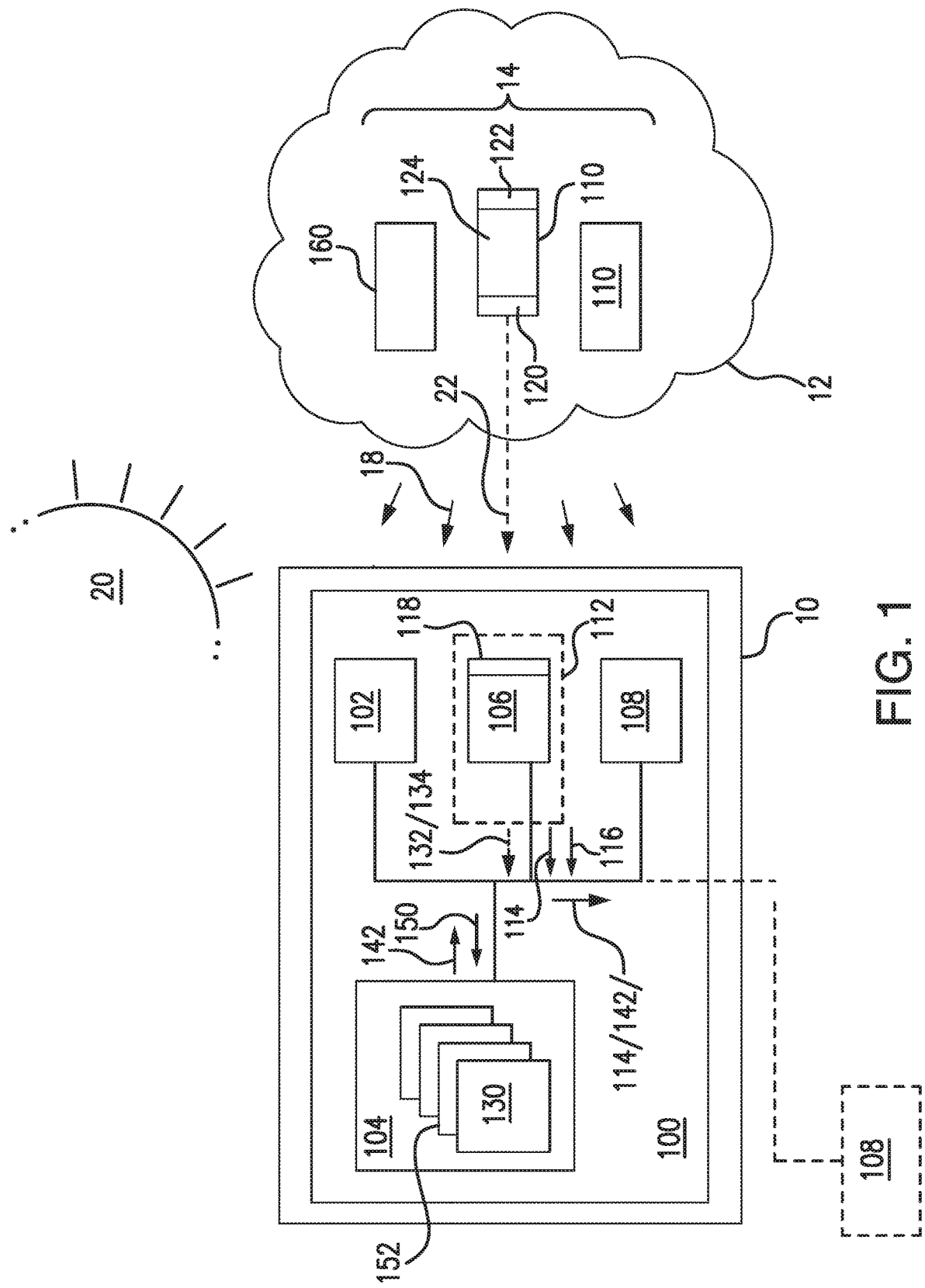
FIG. 1 is a schematic view of an exemplary embodiment of an imaging device constructed in accordance with the present disclosure, showing an image and pulse detection array receiving non-pulsed and pulsed illumination from a scene.

Reference will now be made to the drawings wherein like reference numerals identify similar structural features or aspects of the subject disclosure. For purposes of explanation and illustration, and not limitation, a partial view of an exemplary embodiment of an imaging system in accordance with the disclosure is shown in FIG. 1 and is designated generally by reference character 100. Other embodiments of imaging systems and imaging methods in accordance with the disclosure, or aspects thereof, are provided in FIGS. 2 and 3, as will be described. The imaging systems and imaging methods described herein can be used locating individuals in imaging environments where pulsed illuminating from a locator may not otherwise be readily discernable in an image, such as in imaging difficult terrain or marine environments during search and rescue operations, though the present disclose is not limited to search and rescue operations or any particular type of imaging environment in general.

Referring now to FIG. 1, imaging system 100 is shown. Imaging system 100 includes a controller 102, a memory 104, and an image and pulse detection array 106. Imaging system 100 also includes a user interface 108, one or more locators 110, and an optional director 112. In illustrated exemplary embodiment imaging system 100 is carried within a vehicle 10, which can be manned or unmanned, traversing a scene 12. It is contemplated that scene 12 can include a marine or terrestrial environment, and that an object of interest 14 be located in scene 12. Object of interest 14 can be an individual in need of assistance, such as a lost or injured individual that is the subject of a search and rescue mission.

Controller 102 is operatively connected to image and pulse detection array 106 and director 112. Controller 102 is also disposed in communication with user interface 108 and memory 104. Memory 104 includes a non-transitory machine-readable medium having a plurality of program modules 130 recorded thereon that, when read by controller 102, cause controller 102 to execute certain operations. For example, the instructions recorded on memory 104, when read by controller 102, cause controller 102 to execute the steps of imaging method 200 (shown in FIG. 3), as will be described. It is contemplated that controller 102 be implemented as circuitry, software, or a combination of circuitry, as suitable for an intended application.

Image and pulse detection array 106 is configured an adapted to generate image data 114 and pulse frequency data 116 using light received from scene 12. In this respect image and pulse detection array 106 receives light 18 incident upon and reflected from scene 12, light 18 originating from a source 20 external to scene 12, such as the sun, and generates therefrom image data 114 representative of scene 12. Image and pulse detection array 106 also receives pulsed light 22 originating from within scene 12, and generates therefrom pulse frequency data 116. It is contemplated that image data 114 and pulse frequency data 116 are acquired using a photodiode array 118. Examples of suitable pulse detection arrays and photodiode arrays include those described in U.S. patent application Ser. No. 15/266,837, filed on Sep. 15, 2016, the contents of which are incorporated herein by reference in its entirety.

Light 18 can be ambient illumination, e.g., sunlight. It is contemplated that light 18 can be within a visible waveband, i.e., from within a waveband extending between about 400 nanometers and about 700 nanometers. As will be appreciated by those of skill in the art in view of the present disclosure, light 18 can also be from outside of the visible waveband. For example, light 18 can be from within an infrared waveband, i.e. between about 700 nanometers and about 1 millimeter. Examples of suitable infrared wavebands include near-infrared (NIR) wavebands, shortwave infrared (SWIR) wavebands, mid-wavelength infrared (MWIR), long-wave infrared LWIR) wavebands, and far-infrared (FIR) wavebands. NIR wavebands include electromagnetic radiation with wavelengths between about 0.75 and about 1.4 microns; SWIR wavebands includes electromagnetic radiation with wavelengths between about 1.4 micros and about 3 microns; MWIR wavebands include electromagnetic radiation between about 3 microns and about 8 microns; LWIR wavebands include electromagnetic radiation between about 8 microns and about 15 microns; and FIR wavebands include electromagnetic radiation between about 15 microns and about one millimeter. Photodiode array 118 is responsive to light 18 to generate image data 114, from which an image 140 (shown in FIG. 2) can be constructed.

Pulsed light 22 has a predetermined frequency and/or a modulated pulse frequency. Pulsed light 22 originates from a pulsed light source 120 and is also within the visible portion of the electromagnetic spectrum, i.e., within a visible waveband. In certain embodiments pulsed light 22 light generated by a light-emitting-diode (LED) device. LED devices require relatively little power, which increases the time and/or reduces the size of a power source, e.g., power source 122, powering pulsed light source 120. As will be appreciated by those of skill in the art in view of the present disclosure, light 18 can alternatively be from outside of the visible waveband and can be within one or more of the NIR, SWIR, MWIR, LWIR, and FIR wavebands. As will also be appreciated by those of skill in the art in view of the present disclosure, different sub-divisions of the infrared waveband have differing properties that renders them well suited for search and rescue, e.g., frequencies with low water absorption being suited for use in marine applications, etc., improving the distance at which light 18 can be discerned by imaging system 100. Photodiode array 118 is responsive to pulsed light 22 to generate pulse frequency data 116, from which symbol 142 (shown in FIG. 2) is selected.

Locator 110 is remote from imaging and pulse detection array 106, e.g., is located within scene 12, and includes pulsed light source 120 and power source 122. Power source 122 is electrically connected to pulsed light source 120 for providing electrical power to pulsed light source 120, and can include a battery or solar collection array. It is contemplated that locator 110 be incorporated into a wearable device, hand-held device, a flotation device, a survival suit 124, or any other suitable device worn or donned by an individual in need of assistance.

Director 112 is configured for controlling orientation of image and pulse detection array 106 relative to scene 12 and/or vehicle 10. In this respect director provides one or more of pan, tilt, and zoom capability to image and pulse detection array 106. In certain embodiments director 112 includes a gimbal movably fixed to vehicle 10 that orients image and pulse detection array according to a selected azimuth and deflection relative to vehicle 10. Director 112 is configured to provide either or both of gimbal directional data 132 and/or aircraft positional data 134, which can be used to enhance image 140 (shown in FIG. 2).

User interface 108 is configured for displaying image 140 (shown in FIG. 2) and is disposed in communication with imaging system 100. In certain embodiments user interface 108 is co-located within imaging system 100. For example, user interface 108 can be arranged within a cockpit of aircraft. In accordance with certain embodiments, user interface 108 can be remote (indicated in dashed outline in FIG. 1) from imaging system 100, being located for example in a search and rescue command post, a hand-held device carried by a ground-based search element, or carried in another search aircraft.

Figure 2:
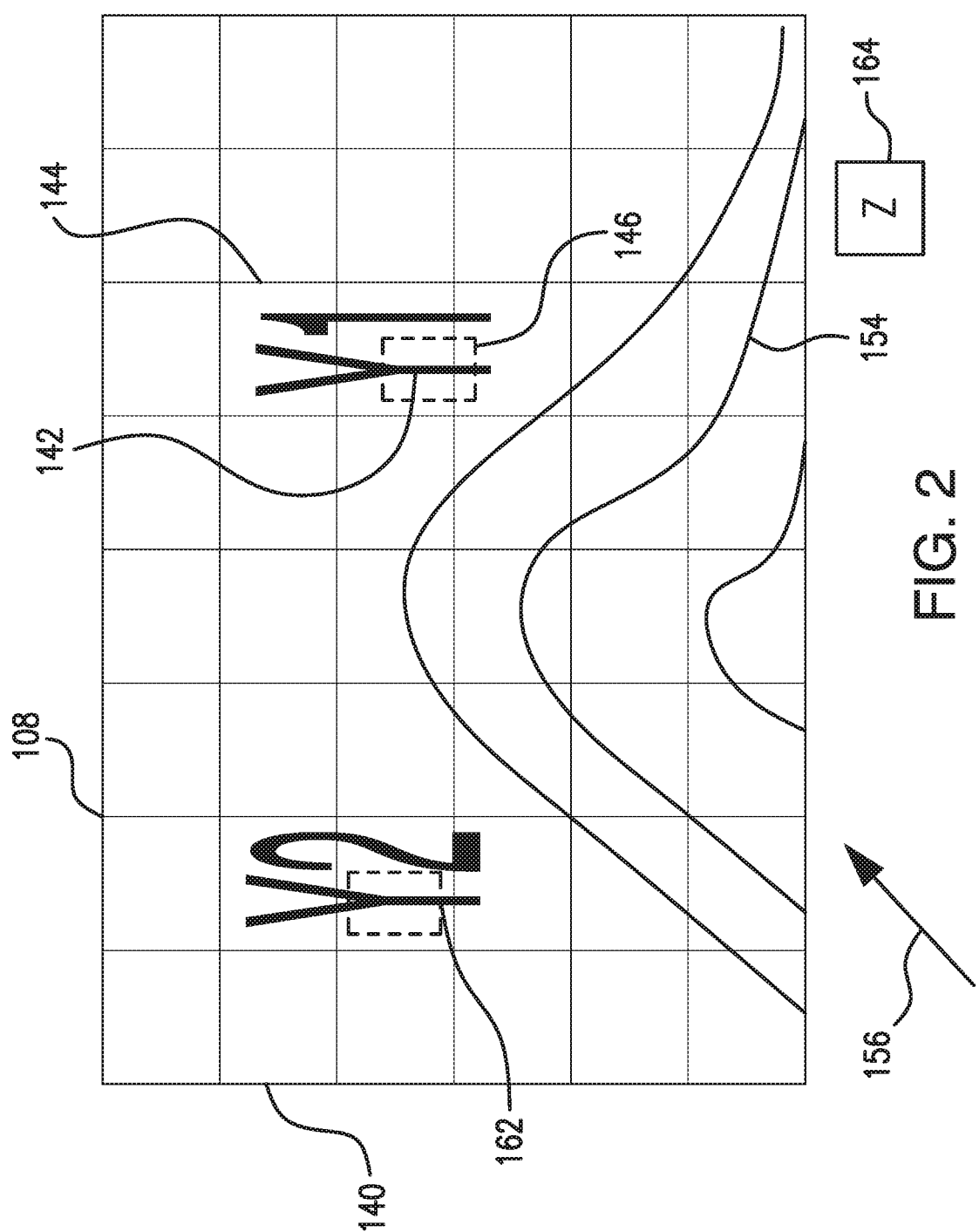
FIG. 2 is a schematic view of an image acquired by the imaging system of FIG. 1, showing an image enhanced with a symbol augmenting pulsed illumination appearing in the scene.

With reference to FIG. 2, image 140 is shown. Image 140 is displayed on user interface 108 (shown in FIG. 1) from image data 114. Image 140 is constructed of a plurality of pixels 144 and includes a signal 146 indicative of pulsed light 22 (shown in FIG. 2) received form pulsed light source 120. In the illustrated exemplary embodiment signal 146 is faint. In this respect signal 146 is not readily discernable to the human eye, i.e., a human observer of image would not readily discern signal 146. In certain embodiments signal 146 occupies five or fewer pixels within image 140, and therefore requires augmentation in order to be reliably discerned by the human eye.

Image 140 is includes at least one enhancement to make more clear the location of pulsed light source 120 in scene 12. In this respect image 140 includes symbol 142. Symbol 142 overlays image 140 in spatial registration with pulsed light source 120 (shown in FIG. 1) in scene 12 (shown in FIG. 1). Symbol 142 makes augments signal 146, making the location of pulsed light source 120 within scene 12. Symbol 142 is selected according to an association of a frequency 150 (shown in FIG. 1) determined from pulse frequency data 116, which is compared to a listing of frequency/symbol associations 152 recorded on memory 104, and which imaging system 100 provides to user interface 108.

In the illustrated exemplary embodiment, image 140 is additionally enhanced with a map overlay 154 and gimbal directional data and aircraft positional information 156. Further, pulsed light source 120 is a first pulsed light source 120, symbol 142 is a first symbol 142, and a second light source 160 is augmented with a second symbol 162. Second symbol 162 is similar to first symbol 142 with the difference that second symbol overlays second light source 160 and is selected according to frequency of second light source 160. The pulsed illuminators may pulse at different frequencies so that they can be distinguished from each other.

A tally 164 is provided image 140, providing a count of pulsed light sources in scene 12 (shown in FIG. 1). The image can be further enhanced by displaying tally 164 of the number of symbols appearing in the image. Tally 164, as well as the associated geographic location data, can be stored for later review and can provide a headcount of individual(s) in need of rescue, as may be needed when ships are abandoned or in aviation accidents. The pulsed illuminators may pulse at different frequencies so that they can be distinguished from each other.

Figure 3:
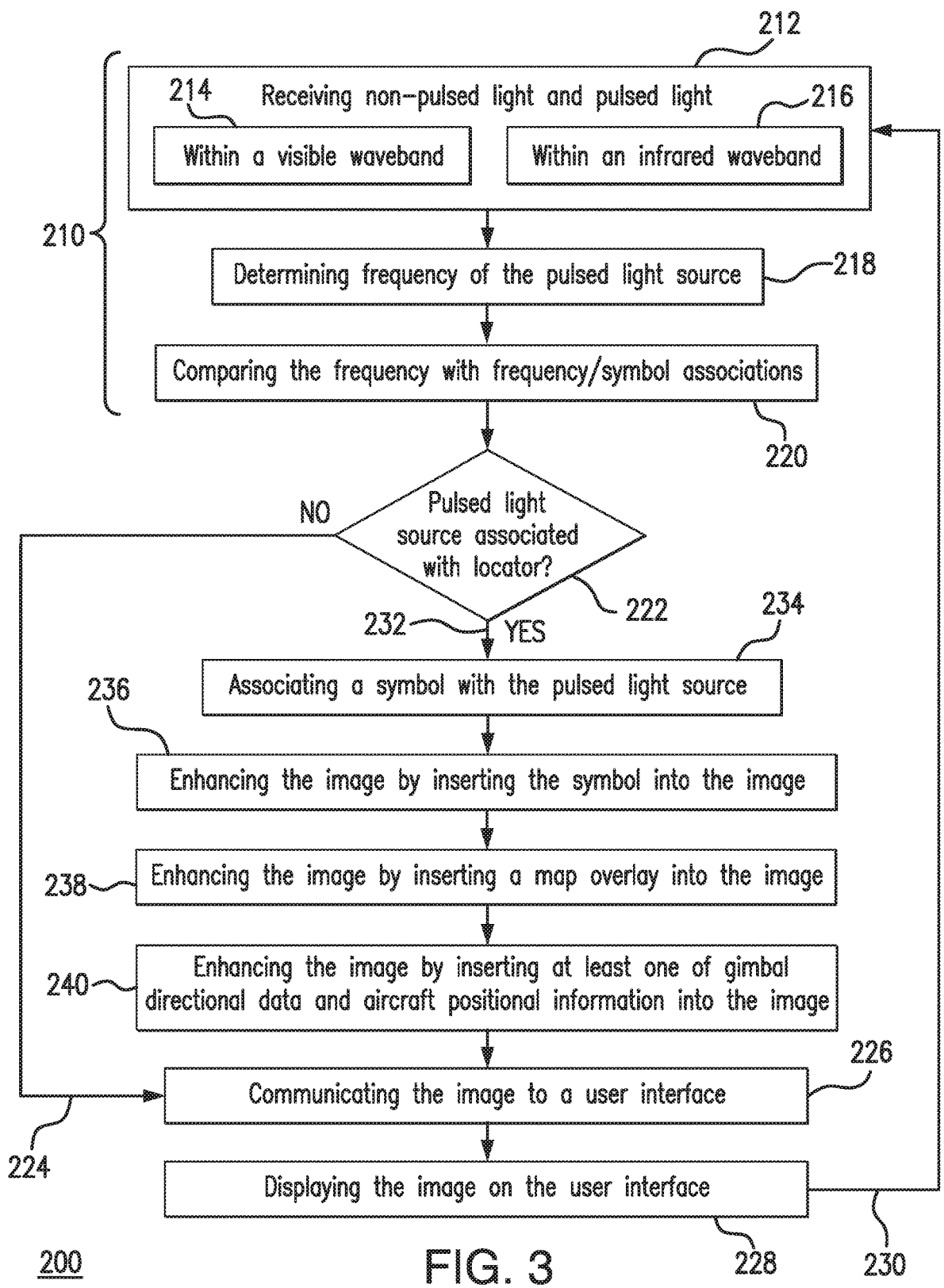
FIG. 3 is a diagram of a method of imaging a scene, e.g., using the imaging device of FIG. 1 to generate the image of FIG. 2, showing steps of the method.

With reference to FIG. 3, a method 200 of imaging a scene is shown. Method 200 imaging a scene having a pulsed light source, e.g., pulsed light source 120 (shown in FIG. 1), as shown with bracket 210. In this respect both non-pulsed light and pulsed light, e.g., non-pulsed light 18 (shown in FIG. 1) and pulsed light 22 (shown in FIG. 1), is received from the scene, as shown with box 212. Either or both the non-pulsed light and pulsed light can be within a visible waveband, as shown with box 214. Either or both the non-pulsed light and pulsed light can be within an infrared waveband, as shown with box 216.

The frequency of the pulsed light source is determined for identifying the source of the pulsed illumination, as shown with box 218. The frequency is compared to a predetermined listing of frequency/symbol associations, as shown with box 220. The frequency/symbol associations may be resident, for example, in a lookup table resident in a program module of a memory, e.g., memory 104 (shown in FIG. 1). Based on the comparison a determination is made as to whether the pulsed light source is associated with a locator device, e.g. locator 110 (shown in FIG. 1), as shown with decision box 222.

When determination is made that the pulsed light source is not associated with a locator device the image is communicated to a user interface, as shown with arrow 224 and box 226. The user interface can display the image, as shown with body 228, and imaging method 200 continue, as shown with arrow 228.

When determination is made that the pulsed light source is associated with a locator a symbol is associated with the pulsed light source, as shown with arrow 232 and box 234. The image is then enhanced with the symbol by inserting the symbol into the image, as shown with box 236. Examples of symbols include first symbol 30 (shown in FIG. 2), which can be displayed in spatial registration with the pulsed light source in the image to enhance the image.

As will be appreciated by those of skill in the art in view of the present disclosure, overlaying the symbol in the image in spatial registration with the location of the pulsed light source in the scene augments indication of the location provided by the pulsed light source because the pulsed light source may not otherwise be readily discernable to a human observer monitoring the displayed image. In this respect the present inventors have come to appreciate the pulsed illumination sources occupying five (5) or fewer pixels in an image tend to increase likelihood that a human observer with not discern the source, potentially prolonging a search effort.

In certain embodiments method 200 can include enhancing the image by inserting a map overlay into the image, as shown with box 238. Such augmented reality mapping techniques enhance features that may not be readily apparent in an image, like roads in forested areas, that otherwise might go unnoticed. This can be advantageous when directing a ground-based search team toward a symbolically indicated location from an aircraft.

In accordance with certain embodiments, method 200 can include enhancing the image by inserting one or more of gimbal directional data and/or aircraft positional information into the image, as shown with box 240. The gimbal directional data and/or aircraft positional information can be projected such that the real-world geographic location of the pulsed light source is marked on a map. Alternatively (or additionally), the gimbal directional data and/or aircraft positional information can be used to direct the aircraft, ground-based searchers, or other aircraft, toward the location of the pulsed light source.

Identifying the location of individuals who have become lost or incapacitated in rugged, wilderness terrain or during maritime operations in can be a difficult endeavor involving significant time and other resources. As a result, lost or incapacitated individuals sometimes perish because they cannot be located quickly. In addition, searching for such locations may require search of large areas, require the employment of aircraft, and be costly due to difficulties attendant with identifying lost or incapacitated people from the air.

In certain embodiments described herein, imaging devices with imaging and pulse detection arrays, e.g., imaging device 100 (shown in FIG. 1), are employed to detect lost and/or incapacitated individuals in a search and rescue situation. Imaging and pulse detection arrays can provide the ability to reliably detect pulsed light sources in situations where an imaging array could otherwise not reliably detect the pulsed light source. For example, in images where a pulsed light source fills five (5) or fewer pixels, the human eye may not take notice the signal associated with the pulsed light source.

Accordingly, in accordance with certain embodiments described above, frequency data generated by the imaging and pulse detection array, pulse frequency data 116 (shown in FIG. 1), is used to identify pulsed light sources in a scene being imaged and overlay an image of the scene with a symbol, e.g., symbol 142 (shown in FIG. 2). The symbol enhances the location of the pulsed light source within the image, making signals indicative of the location of a lost and/or incapacitated individual in the image readily discernable to the human eye. It is contemplated that the location of the pulsed light source can be enhanced when the pulsed light source is faint. For example, when the pulsed light source is difficult to perceive in the image due to large amounts of ambient illumination, such as during bright daylight, the symbol enhances the image with the location of the pulsed illumination in the image. Similarly, when the pulsed light source is faint during intervals of low ambient illumination, such as during nighttime or during poor weather, the symbol enhances the image with the location of the pulsed light source in the image. In each case the symbol makes it more difficult for an observer to overlook the pulsed light source in the image.

It is also contemplated that, in accordance with certain embodiments, augmented reality mapping can be employed. In this respect image data, with the symbol when a pulsed light source is determined to be present in a scene, is further enhanced with mapping information, e.g., mapping information 154 (shown in FIG. 2). The mapping information can be inserted in the image with the symbol in spatial registration with the scene, thereby providing mapping information in association with the symbol and image the surrounding scene. In further embodiments, the image data can be enhanced with either or both of gimbal directional data and vehicular positional data, e.g., aircraft global positioning system (GPS) data, as shown in FIG. 2 with reference numeral 156. The image data, enhanced with geo-positional information can be communicated to other search assets, like a search command post, ground search teams, other search aircraft, or watercraft participating in the search.

The present disclosure provides a small, compact, and highly reliable method for rapidly searching wide swaths of terrain or marine environments. This invention enables the detection and accounting of lost or incapacitated individual(s) when traditional search methods fail, such as when the searchers are searching from high above the lost individual(s) and when other optical signals that indicate the location of the lost individual(s) are difficult to distinguish from the background with existing tech.

The methods of imaging a scene and imaging systems of the present disclosure, as described above and shown in the drawings, provide for imaging with superior properties including the capability to locate individuals in need of assistance that otherwise cannot be discerned by the human eye and/or occupy fewer pixels in an image than can be recognized by the human eye. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An imaging method, comprising:
   receiving captured image data generated in association with sensing non-pulsed light incident on and reflected from a scene and pulsed light generated by pulsed light source within the scene;
   generating an image of the scene based on the captured image data;
   associating a symbol with a portion of the image that corresponds to the captured pulsed light from the pulsed light source; and
   enhancing the image by inserting the symbol into the image indicative of a location of the pulsed light source in the scene, wherein the symbol overlays the image in spatial registration with the location of the pulsed light source in the scene to emphasize visibility in the image of an indication in the image of the location of the pulsed light source.

2. The imaging method as recited claim 1, further comprising receiving and sensing the non-pulsed light and pulsed light.

3. The imaging method as recited in claim 2, wherein the pulsed light is within a visible waveband.

4. The imaging method as recited in claim 2, wherein the non-pulsed light is within a visible waveband.

5. The imaging method as recited in claim 1, further comprising determining frequency of the pulsed light.

6. The imaging method as recited in claim 5, further comprising:
   comparing the frequency of the pulsed light to a predetermined set of frequency/symbol associations; and
   selecting the symbol based on a result of the comparison.

7. The imaging method as recited in claim 1, further comprising enhancing the image by inserting a map overlay into the image.

8. The imaging method as recited in claim 1, further comprising enhancing the image by inserting at least one of gimbal directional data and aircraft positional information into the image.

9. The imaging method as recited in claim 1, further comprising communicating the image to a user interface.

10. The imaging method as recited in claim 9, wherein the user interface is co-located with the imaging system.

11. The imaging method as recited in claim 9, wherein the user interface is remote from the imaging system.

12. The imaging method as recited in claim 1, wherein the pulsed light source occupies five (5) or fewer pixels in the image.

13. The imaging method as recited in claim 1, wherein the pulsed light source is a first pulsed light source and the symbol is a first symbol, the method further comprising associating a second symbol with a portion of the Image that corresponds to captured pulsed light from A second light source; enhancing the image by inserting the second symbol into the image indicative of a second location of the second pulsed light source in the scene, wherein the second symbol overlays the image in spatial registration with the second location of the second pulsed light source in the scene; and displaying a tally of symbols enhancing the image.

14. An imaging system, comprising:
   an imaging and pulse detection array;
   a controller disposed in communication with a memory and operatively connected to the imaging and pulse detection array, the memory having a plurality of program modules recorded therein with instructions that, when read by the controller, cause the controller to:
receive captured image data generated in association with sensing non-pulsed light incident on and reflected from a scene and pulsed light from a scene, wherein the pulsed light is generated by a pulsed light source within the scene;
generate an image of the scene based on the captured image data;
associate a symbol with a portion of the image that corresponds to the captured pulsed light from the pulsed light source; and
enhance the image by inserting the symbol into the image indicative of a location of the pulsed light source in the scene, wherein the symbol overlays the image in spatial registration with the location of the pulsed light source in the scene.

15. The imaging system as recited in claim 14, wherein the pulsed light has a selected frequency, wherein the frequency is associated with a symbol in a lookup table recorded on the memory.

16. The imaging system as recited in claim 15, wherein the pulsed light source is remote from the imaging system and powered by a self-contained power supply.

17. The imaging system as recited in claim 15, wherein the pulsed light is incorporated into a wearable device, a hand-held device, a flotation device, or a survival suit.

* * * * *